E. W. A. SCHEUNEMANN.
HAYRACK FOR VEHICLES.
APPLICATION FILED JULY 17, 1918.
1,316,195.
Patented Sept. 16, 1919.
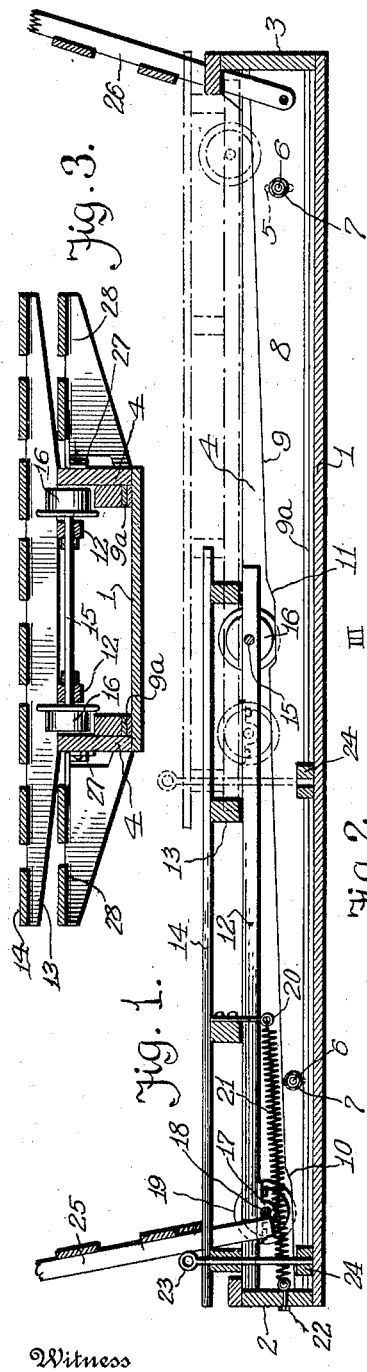
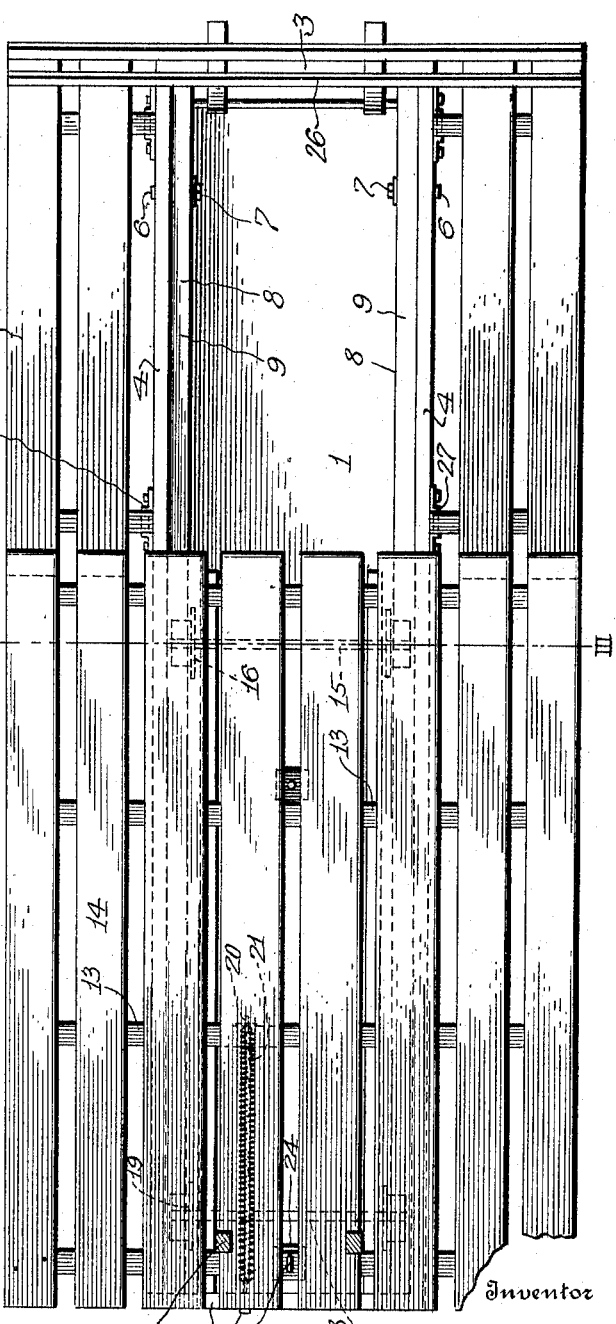

UNITED STATES PATENT OFFICE.

EDWARD W. A. SCHEUNEMANN, OF NEW HAVEN, MICHIGAN.

HAYRACK FOR VEHICLES.

1,316,195.  Specification of Letters Patent.  Patented Sept. 16, 1919.

Application filed July 17, 1918. Serial No. 245,269.

*To all whom it may concern:*

Be it known that I, EDWARD W. A. SCHEUNEMANN, a citizen of the United States of America, residing at New Haven, in the county of Macomb and State of Michigan, have invented certain new and useful Improvements in Hayracks for Vehicles, of which the following is a specification, reference being had to the accompanying drawings.

The object of my invention is to provide a hay rack that may be advantageously used in connection with a farm wagon bed, such as ordinarily employed for hauling other matter, said rack fitting on and in the bed so as to increase the carrying capacity of the same.

Another object of my invention is to furnish a vehicle body with a shiftable rack that may be loaded at one end of the body and then shifted to the opposite end thereof, so that the space originally occupied by the rack may be filled. Such a rack obviates the necessity of employing two laborers to load both ends of a vehicle body, or the time wasted by a laborer in moving from one end of the vehicle body to the other, or attempting to load both ends from a central position, which is practically impossible, when a large load of hay or similar matter is to be carried by the vehicle.

Another object of my invention is to provide a hay rack of the above type wherein the parts are constructed with a view of reducing the cost of manufacture and at the same time retain those features by which safety, durability, ease of manipulation, and ease of installing are secured. With such ends in view, my invention resides in the novel construction, combination and arrangement of parts to be hereinafter specifically described and then claimed.

Reference will now be had to the drawing, wherein

Figure 1 is a longitudinal sectional view of the hay rack in connection with a wagon bed;

Fig. 2 is a plan of the same; and

Fig. 3 is a cross sectional view taken on the line III—III of Fig. 2.

In the drawing there is illustrated a conventional form of vehicle body comprising a bed 1, a front wall 2, a rear wall 3, and longitudinal side walls 4. The side walls 4, adjacent the ends thereof, are slotted, as at 5, to accommodate bolts 6 having nuts 7, said bolts and nuts constituting suitable fastening means for adjustably holding rails 8, at the inner sides of the walls 4.

The rails 8 rest on shims or strips $9^a$ on the bed 1, and it is through the medium of these shims or strips and the rail fastening means 6 that said rails can be placed at a suitable elevation, relative to the bed 1, so as to properly support the hay rack. The upper edges of the rails 8 are inclined, as at 9, and at the forward ends of said rails are depressions 10, with similar depressions 11 intermediate the ends of said rails.

The hay rack, comprises longitudinal parallel frames 12 provided with a plurality of equally spaced beams 13 supporting longitudinal slats 14, constituting a platform of greater width than the vehicle body, as best shown in Figs. 2 and 3.

Mounted in the rear ends of the frames 12 is an axle 15 having the ends thereof provided with flanged wheels 16 adapted to travel on the inclined upper edges 9 of the rails 8.

The front ends of the frames 12 are provided with bearings 17 for an axle 18 and the ends of said axle have flanged wheels 19 also adapted to travel upon the rails 8.

One of the transverse beams 13 adjacent the forward end of the rack is provided with a depending eye bolt or bracket 20 connected by a coiled retractile spring 21 to an eye bolt 22, carried by the front wall 2 of the vehicle body. The retractile force of the spring 21 is adapted to retain the hay rack at the forward end of the vehicle body and after said hay rack is shifted to the rear end thereof, as shown by dot and dash lines in Fig. 1, the retractile force of the spring 21 will impart sufficient impetus to the hay rack to travel downwardly on the rails 8 and assume its normal position at the forward end of the vehicle body.

To lock the hay rack in either position, the forwardmost transverse beam 13 is provided with a locking pin 23 adapted to engage in a keeper 24 on the bed 1 of the vehicle body. One of the keepers 24 is located adjacent the front wall 2 and a similar keeper is located intermediate the ends of the bed 1, so that the locking pin 23 may hold the rack in either position and prevent accidental displacement. The locking pin 23 constitutes suitable means for locking the hay rack.

At the forward end of the hay rack is a detachable ladder or guard 25 and at the rear end of the vehicle body is a pivoted and detachable ladder or guard 26, these ladders or guards being of a slatted construction somewhat similar to that ordinarily used in connection with hay racks.

On the outer side of the walls 4 at the rear end of the vehicle body are straps 27 for holding the side platforms or racks 28, said platforms being braced relative to the walls 4 and extending outwardly from the outer edges of said walls to a width corresponding to that of the shiftable hay rack 14.

With the shiftable hay rack at the forward end of the vehicle body, the transverse beams 13 rest on the upper edges of the walls 4, with the wheels 16 and 19 out of contact with the rails 8, so that the hay rack will be firmly supported and may be locked by the pin 23. When it is desired to load the hay rack, the pin 23 is removed and the rack shifted toward the rear end of the vehicle body and locked at such end by replacing the pin 23. When pushing the shiftable rack rearwardly, said rack is elevated and does not interfere with the side racks 28. In its adjusted position it may be safely loaded by a single laborer and on being loaded the pin 23 may be withdrawn to allow the rack to descend by gravity to the forward end of the vehicle body, where it may be again locked in position. The rear end of the vehicle body can then be loaded and the loading of both ends of the vehicle is accomplished with minimum labor.

It is thought that the operation and utility of the rack will be apparent without further description, and while in the drawing there is illustrated a preferred embodiment of my invention it is to be understood that the structural elements are susceptible to such changes, in size, shape and manner of assemblage, as fall within the scope of the appended claims.

What I claim is:—

1. The combination with a vehicle body having side walls, of inclined rails adjustably connected to the inner side of said walls, longitudinal shims interposed between the lower edges of said rails and said vehicle body, a shiftable hay rack normally on the upper edges of said walls at the forward end of said wagon body, and having wheels adapted to travel on said rails when said hay rack is shifted to the rear end of the body, said rails having depressions adapted to prevent accidental shifting of said rack when at the front end of the vehicle body, means connecting said hay rack to the forward end of said body longitudinally and centrally thereof adapted to restore said hay rack to the normal position at the forward end of said wagon body, and means adapted to hold said hay rack at the rear end of said body for loading purposes.

2. The combination with a wagon body having side walls, of adjustable inclined rails supported by said wagon body and connected to the side walls thereof, a hay rack normally resting on the side walls at the forward end of said wagon body, wheels carried by said hay rack and adapted to travel on said rails when said hay rack is shifted from one end of said body to the opposite end thereof, a spring connecting said hay rack to the forward end of said wagon body and adapted by its retractile force to lend impetus to said hay rack in descending said rails from the rear end of said wagon body to the forward end thereof, said rails having depressions for the wheels of said hay rack adapted to prevent accidental shifting of said hay rack when at the forward end of the wagon body, a keeper intermediate the ends of said wagon body, a keeper at the forward end of said wagon body, and a pin carried by the forward end of said hay rack and adapted to engage in either keeper to positively lock said hay rack from longitudinal movement.

In testimony whereof I affix my signature in the presence of two witnesses.

EDWARD W. A. SCHEUNEMANN.

Witnesses:
HERBERT WARWICK,
FRANK SCHMIDT.